United States Patent [19]
Sumikawa et al.

[11] 3,821,895
[45] July 2, 1974

[54] HEAT FLOW METER FOR REMOTE MEASUREMENT

[75] Inventors: Sadao Sumikawa; Yoshiaki Arakawa, both of Yokohama, Japan

[73] Assignee: Showa Danko K. K., Tokyo, Japan

[22] Filed: Sept. 27, 1972

[21] Appl. No.: 292,556

[30] Foreign Application Priority Data
Sept. 29, 1971 Japan.............................. 46-75403

[52] U.S. Cl.............................. 73/190 H, 73/355 R
[51] Int. Cl............................................. G01r 17/00
[58] Field of Search ........... 73/15, 190 H, 341, 342, 73/355

[56] References Cited
UNITED STATES PATENTS

| | | | |
|---|---|---|---|
| 1,528,383 | 3/1925 | Schmidt................................ | 73/190 |
| 3,075,377 | 1/1963 | Lang...................................... | 73/15 |
| 3,114,836 | 12/1963 | Fergason et al. ...................... | 250/83 |
| 3,238,775 | 3/1966 | Watts..................................... | 73/190 |
| 3,566,669 | 3/1971 | Lawrence et al. ..................... | 73/15 |

FOREIGN PATENTS OR APPLICATIONS

| | | | |
|---|---|---|---|
| 587,996 | 5/1947 | Great Britain........................ | 73/190 |

OTHER PUBLICATIONS

Brown et al., "Steady State Heat Flux Gauge", in the Review of Scientific Inst., Aug. 1961, pg. 984–985.

*Primary Examiner*—Herbert Goldstein
*Attorney, Agent, or Firm*—Kemon, Palmer & Estabrook

[57] ABSTRACT

A heat flow meter for remote measurement comprising a heat measuring element consisting of a heat conductive substrate and a thin thermal resistance plate mounted on said substrate and having the surface coated with a specified color so as to provide appropriately the same heat emissivity as that of the heat radiating surface of an object whose heat is to be measured; and a noncontact thermometer for measuring the temperature of the surface of said substrate and that of the surface of the thermal resistance plate, the heat conductance of said thermal resistance plate ranging between about 100 and about 1,000 Kcal/m²·h·deg. within the temperature range of from about 350° to about 700°K.

1 Claim, 5 Drawing Figures

3,821,895

HEAT FLOW METER FOR REMOTE MEASUREMENT

BACKGROUND OF THE INVENTION

This invention relates to a heat flow meter for remote measurement which is capable of simultaneously measuring the temperature of, and the amount of heat released from, a rotating or remote heat radiating surface.

A common process of measuring the amount of heat released from the heat radiating surface of an object consists in fitting a thin thermal resistance plate to said surface and reading out in the form of electric signals different temperatures appearing on said surface in the direction in which heat is applied. Said electric signals are generally read out through a lead. For measurement, therefore, of the amount of heat delivered from the heat radiating surface of a rotary kiln or rotary drier, it is necessary to take special means such as fitting a slidable ring to said heat radiating surface. Where measurement is to be made of the amount of heat given forth from a remote radiating surface as in the case of a heated body positioned in an elevated place, a long lead must be used, possibly resulting in a complicated arrangement and frequent disconnection of the lead. Accordingly, the conventional heat measuring process using a lead was accompanied by considerable practical inconvenience.

Further, experiments have been made to utilize a device resembling a radio transmitting or receiving set in measuring the amount of heat discharged from a heat radiating object but this process naturally has a complicated mechanism and becomes expensive. Since a high temperature normally prevails near a heat radiating surface, the aforesaid device will present great difficulties in maintaining its desired function if it is used in such a hot place. Therefore, such devices are not considered to be particularly practical.

SUMMARY OF THE INVENTION

Accordingly, this invention is intended to provide a heat flow meter capable of simultaneously measuring the temperature of, and the amount of heat released from, an object from a remote measuring location.

A heat flow meter according to this invention which uses a radiation thermometer having a small field of view eliminates the necessity of providing a lead or a device resembling a radio transmitting or receiving set when measuring from a remote place the amount of heat emitted from the heat radiating surface of an object. This heat flow meter can simultaneously measure, from a remote place, the temperature of a heat radiating surface and particularly the amount of heat given forth therefrom with high precision. Though not limited to, it will have prime utility in measuring the amount of heat delivered from the heat radiating surface of rotary kilns, or other moving or remotely located heat radiating surfaces.

DETAILED DESCRIPTION OF THE INVENTION

Figure 1:
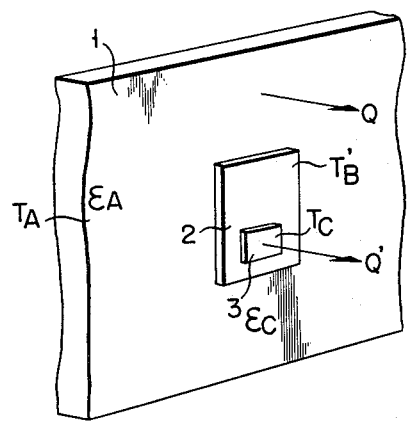
FIG. 1 illustrates the principle on which the heat flow meter of this invention is based.

There will now be described by reference to FIG. 1 the principle on which this invention is based. Referring to FIG. 1, the temperature of a heat radiating surface 1 is designated as $T_A$ (°K) and the amount of heat released therefrom as $Q(Kcal/m^2 \cdot h)$. The temperature of the backside of the thermal resistance plate 3 mounted on a substrate 2 made of heat conductive material such as copper, silver, aluminum, brass, soft steel, or graphite is represented by $T_B$(°K) (not shown), said thermal resistance plate being formed of heat resisting material such as a ceramic product, glass or mica or a compound containing fluorine resin. The temperature of the upper side of said thermal resistance plate 3 is denoted by $T_C$(°K). One or more thermal resistance plates 3 may be used. The atmospheric temperature is indicated by $T_O$(°K). Further, the film coefficient of heat transfer across the heat radiating surface of an object and the air is represented by $H(Kcal/m^2 \cdot h \cdot deg.)$ and the heat emissivity of the heat radiating surface of the object by $\epsilon_A$ and the heat emissivity of said thermal resistance plate 3 by $\epsilon_C$. Then the amount of heat $Q(Kcal/m^2 \cdot h)$ released per unit area of the heat radiating surface of the object before said surface is fitted with the substrate 2 and thermal resistance plate 3 (jointly hereinafter referred to as "a heat measuring element") may be expressed by the following equation:

$$Q = H(T_A - T_O) + \epsilon_A \sigma(T_A^4 - T_O^4) \quad (1)$$

where $\sigma$ is the Stefan-Boltymann's constant.

The amount of heat $Q'(Kcal/m^2 \cdot h)$ given forth through said heat measuring element when it is closely fitted to the heat radiating surface of the object may be expressed by the formula of one dimensional heat transfer because the thermal resistance plate 3 of the heat measuring element has a very small thickness. Therefore, with $H'$ taken to represent the film coefficient of heat transfer across the portion of the heat radiating surface of the object near the fitted heat measuring element and the air, then the amount $Q'$ of heat discharged through said heat measuring element may be expressed as $$Q' = H'(T_C - T_O) + \epsilon_C \sigma(T_C^4 - T_O^4) = K(T_B - T_C) \quad (2)$$

where K is the unit heat conductance $(Kcal/m^2 \cdot h \cdot deg.)$ of the thermal resistance plate 3 (in this case K includes not only the heat resistance of said thermal resistance plate 3 but also the heat resistance of the extremely narrow region between the substrate 2 and said thermal resistance plate 3).

In the case of a common high temperature furnace whose outer wall consists of a metal plate and which has a large heat capacity, the temperature of the heat radiating surface of such furnace is little affected by the fitting of the aforesaid heat measuring element and remains substantially fixed at $T_A(°K)$. With the unit contact heat conductance between the heat measuring element and the heat radiating surface of furnace represented by $\gamma$ (Kcal/m²·h·deg.), then $Q'$ may also be expressed as $$Q' = \gamma(T_A - T_B) \quad (3)$$

With the temperature difference $(T_B - T_C)$ between both surfaces of the thermal resistance plate 3 denoted by $\Delta T$, the following equation results:

$$\Delta T = T_B - T_C \quad (4)$$

Now let it be assumed that the thermal resistance plate 3 is sufficiently thin to prevent natural convection from being disturbed. Then the film coefficient of heat transfer between an object and the air may be expressed as $$H = h(T_A - T_O)^{0.25}$$
$$H' = h(T_C - T_O)^{0.25}$$

where $h$ is a constant.

From the equations (2) and (3), therefore, there results $$T_A = (K/\gamma)\Delta T - T_B \quad (3)'$$

When development is made by substituting $(3)'$ in the equation (1), then the following equation results:

$$Q = h([K/\gamma]\Delta T = T_B - T_O)^{1.25} + \epsilon_A \sigma \{(K/\gamma)(\Delta T + T_B)^4 - T_O^4\}$$
$$= h(T_B - T_O)^{1.25} + 1.25h(T_B - T_O)^{0.25}([K/\gamma]\Delta T) +$$
$$0.156h(T_B - T_O)^{-0.75}([K/\gamma]\Delta T)^2 + \ldots$$
$$+ \epsilon_A \sigma(T_B^4 - T_O^4) = 4\epsilon_A \sigma T_B^3 ([K/\gamma]\Delta T) +$$
$$6\epsilon_A \sigma T_B^2[K/(\gamma \Delta T)]^2 + \ldots$$

Since $T_C = T_B - \Delta T$ $(4)'$ as is apparent from equation (4) development with the equation $(4')$ substituted in the equation (2) will give the following equation:

$$Q' = h(T_B - T_O - \Delta T)^{1.25} + \epsilon_C \sigma\{(T_B - \Delta T)^4 - T_O^4\}$$
$$= h(T_B - T_O)^{1.25} - 1.25h(T_B - T_O)^{0.25}\Delta T +$$
$$0.156h(T_B - T_O)^{-0.75}(\Delta T)^2 - \ldots$$
$$+ \epsilon_C \sigma(T_B^4 - T_O^4) - 4\epsilon_C^{**}T_B^3\Delta T + 6\epsilon_C \sigma T_B^2(\Delta T)^2 - \ldots$$

$Q - Q'$ is determined from the two developed equations. In this case, $Q' = K T$ (this is derived from the equations (2) and (4) ). Further in the case of $\epsilon_A \cong \epsilon_C$, the following equation will be obtained:

$$Q - Q' = Q - K\Delta T$$
$$= 1.25h(T_B - T_O)^{0.25}([K/\gamma]\Delta T + \Delta T) -$$
$$0.156h(T_B - T_O)^{-0.75}\{-([K/\gamma]\Delta T)^2 + (\Delta T)^2\} + \ldots$$
$$+ 4\epsilon_C \sigma T_B^3([K/\gamma]\Delta T + \Delta T) -$$
$$6\epsilon_A \sigma T_B^2\{-([K/\gamma]\Delta T)^2 + (\Delta T)^2\} + \ldots$$

When arranged, the above equation will lead to the following equation:

$$Q = \Delta T \left[ K + \{1.25h(T_B - T_O)^{0.25} + 4\epsilon_C \sigma T_B^3\}\left(1 + \frac{K}{\gamma}\right)\right]$$
$$- (\Delta T)^2[0.156h(T_B - T_O)^{-0.75} + 6\epsilon_C \sigma T_B^2]\left\{1 + \left(\frac{K}{\gamma}\right)^2\right\} + \quad (5)$$

Where trial calculation is made in consideration of the ordinary conditions in which heat is measured, the following approximation equation results with the terms succeeding $(\Delta T)^2$ overlooked:

$$Q = \Delta T \left[ K + \{1.25h(T_B - T_O)^{0.25} + 4\epsilon_C \sigma T_B^3\}\left(1 - \frac{K}{\gamma}\right)\right] \quad (6)$$

Namely, if the heat conductance K of the thermal resistance plate 3 can be determined, the contact heat conductance $\gamma$ between the heat measuring element and the heat radiating surface of an object, a constant $h$ associated with the film coefficient of heat transfer across the neighborhood of said heat radiating surface and the air, the heat emissivity $\epsilon_C$ of the upper surface of the thermal resistance plate 3 and the temperature $T_B$ of the substrate 2, then it will be possible to define the relationship of $\Delta T$ and Q. It will be noted that once the heat measuring element is fitted to an object, K, $\gamma$, h and $\epsilon_C$ may generally be taken as constants. Since $\sigma$ is the Stefan-Boltymann's constant, Q is substantially a function of only $\Delta T$ and $T_B$. If, therefore, the relationship of two values $\Delta T$ and $T_B$ is found by some means, then it will be possible to determine Q, namely, the amount of heat released from the heat radiating surface of an object. For practical purposes, it is only required to determine in advance the relationship of $Q/\Delta T$ and $T_B$ by fitting a heat measuring element to a heat radiating plate giving forth a known amount of heat. To attain $\epsilon_A \cong \epsilon_C$, the surface of the thermal resistance plate 3 is painted with a specified color so as to make the heat emissivity of the surface of the thermal resistance plate 3 substantially equal to that of the heat radiating surface of an object.

Where $T_B$ and $T_C$ are measured by a radiation thermometer using the heat measuring element, it is impossible to find the temperature $T_B$ of the backside of the thermal resistance plate 3, though the temperature $T_C$ of its upper surface may be easily determined. Therefore, the customary practice is to measure the temperature $T_B'$ of the upper surface of the heat conductive substrate 2. Where the heat conductive substrate 2 is present in an area of low heat conductivity such as atmosphere, then there results the equation $T_B' = T_B$ with extremely high precision. Accordingly, if the relationship of $Q/\Delta T'$ and $T_B'$ is determined in advance from the following equation $$\Delta T' = T_B' - T_C \quad (7)$$

then it will be possible to measure the amount Q of heat discharged from an object.

Even in cases other than natural convection there is pracically established substantially the same relationship as described above.

Figure 2:
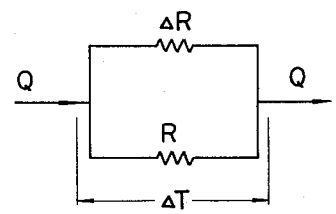
FIG. 2 is an electric equivalent circuit diagram showing the manner in which heat is conducted through a heat measuring element fitted to a radiating surface.

The following describes the electric equivalent circuit of FIG. 2 concretely indicating the equation (6). For convenience of description, $\Delta R$ and R are assumed to have values expressed by the following equation. Obviously, however, these values are interchangeable.

$$\Delta R = \frac{1}{\{1.25h(T_B-T_0)^{0.25}+4\epsilon_C\sigma T_B\}\left(1+\frac{K}{\gamma}\right)} \quad (8)$$

$$R = 1/K \quad (9)$$

where $\Delta R$ and $R$ represent the values of electric resistance.

To define the practically proper value of the heat conductance $K$ of the thermal resistance plate 3, the following studies were made. Namely, where $\Delta R$ is substantially larger than $R$, the amount of heat $Q$ being measured mostly passes through the heat measuring element. This means that heat being measured is little disturbed by the fitting of the heat measuring element to the heat radiating surface 1 of an object, a condition favorable for measurement of heat. Under such condition, errors in measuring the amount of released heat $Q$ will be negligibly small, even if $\Delta R$ slightly fluctuates.

To let $\Delta R$ have a large value, $K/\gamma$ in the equation (8) should be rendered as small as possible. From the foregoing description, it will be apparent that the heat conductance $K$ of the thermal resistance plate 3 should meet the following condition $$\gamma > K > 1.25h(T_B-T_0)^{0.25}+4\epsilon_C\sigma T_B^3 (1+[K/\gamma]) \quad (10)$$

If care is taken in attaining the tight fitting of the heat measuring element to the heat radiating surface 1 of an object, then the contact heat conductance $\gamma$ will be made to have a value of about 1,000 Kcal/m²·h·deg. If, therefore, the heat conductance $K$ of the thermal resistance plate 3 is chosen to indicate 100 to 1000 Kcal/m²·h·deg. at the temperature $T_B'$ of the heat conductive substrate 2 ranging from about 350° to 700°K, then the equation (10) will always be satisfied, bringing about a favorable condition for measurement of heat. The reason is that under the normal condition inwhich an amount of heat is measured, the higher the temperature of the substrate, the larger the value of the following equation:

$$1.25h(T_B-T_0)^{0.25}+4\epsilon_C\sigma T_B^3 (1+[K/\gamma])$$

(hereinafter taken as $\Delta K$), namely, $\Delta K$ will have under the normal condition about 20 Kcal/m²·h·deg. at the temperature $T_B'$ of the heat conductive substrate 2 standing at about 350°K and about 100 Kcal/m²·h·deg. at the temperature $T_B'$ of 700°K.

$\Delta K$ has a positive temperature dependence, so that if the termal resistance plate 3 is made of material such as asbestos or mica having a similar positive temperature dependence so as to cause their heat conductance to satisfy the equation (10), then the temperature difference $\Delta T (\cong \Delta T')$ will be indicated in an enlarged value even at a low temperature at which heat is generally given forth in a small amount, thus offering great advantage in measuring the amount of heat by a radiation thermometer, and in consequence elevating the precision of measurement.

There will now be described by reference to FIG. 3 the operation of a remotely measurable heat flow meter according to this invention.

Figure 3:
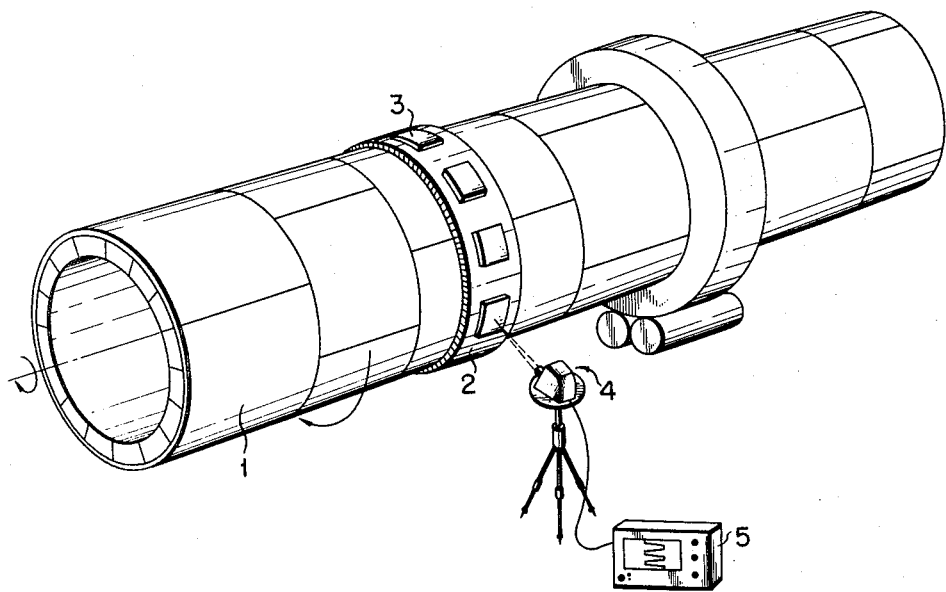
FIG. 3 is a perspective view of the heat flow meter of the invention used with a heated object.

FIG. 3 is a perspective view of the arrangement for measuring an amount of heat released from a rotary kiln with its outer wall fitted with a heat measuring element based on the principle of this invention. Numeral 1 is the outer wall of the rotary kiln. Numeral 2 is a ring-shaped substrate consisting of a copper plate about 3 mm thick tightly mounted on the outer wall 1 of the kiln, said copper plate being coated sith such color as provides the same heat emissivity as that of the rotary kiln. Numeral 3 denotes a plurality of thin thermal resistance plates prepared from mica-base material and bonded to the substrate 2 with heat resisting cement of high alumina base. Numeral 4 is an infrared radiation thermometer alternately measureing with the rotation of the rotary kiln the surface temperature of the ring-shaped copper substrate 2 and that of the thin mica-base thermal resistance plate 3. Numeral 5 is a recorder connected to the infrared radiation thermometer 4. The width and length of the thermal resistance plates 3 and the distance between them are so determined as to meet the field of view of the infrared radiation thermometer 4 and cause said thermometer 4 and recorder 5 to make a full response to the rotating speed of the surface of the rotary kiln. Further, the thermal resistance plates 3 have their surface coated with the same color as that of the substrate 2.

The following explains why an infrared radiation thermometer is used in detecting the temperature difference $(T_B'-T_C)$. The output characteristics of said thermometer have a magnitude proportional to an $n$ order multiple of the temperature measured. The relationship of temperature (T°C) and the output V (in millivolts) of the infrared thermometer 4 included in the heat flow meter of this invention which is capable of measuring temperatures ranging from 130° to 210°C may be approximately expressed by the following numerical formula:

$$V = 2.2 \times 10^{-10} T^5 \quad (11)$$

Namely, when the temperature difference $\Delta T$ is detected, variation of the output of said infrared thermometer 4 may be indicated as $$\Delta V/V = 5\Delta T/T \quad (12)$$

Figure 4:
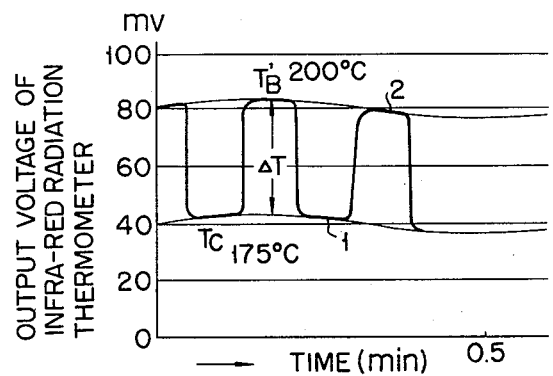
FIG. 4 presents actual measurements of heat using the heat flow meter of the invention.

As seen from the above equation (12), variation of the output of the infrared thermometer is 5 times that of temperature, proving that said thermometer has a good detecting power. FIG. 4 presents the case where temperature was actually measured by a heat flow meter of the above-mentioned arrangement. Referring to FIG. 4, numeral 1 represents the temperature $T_C$°K of the surface of the thermal resistance plates 3 and numeral 2 the temperature $T_B'$°K of the surface of the ring-shaped copper substrate. From FIG. 4 there results $$T_B' = 200°C (473°K)$$
$$T_C = 175°C (448°K)$$

Therefore, $$\Delta T' = T_B' - T_C = 25 \text{ deg.}$$

Figure 5:
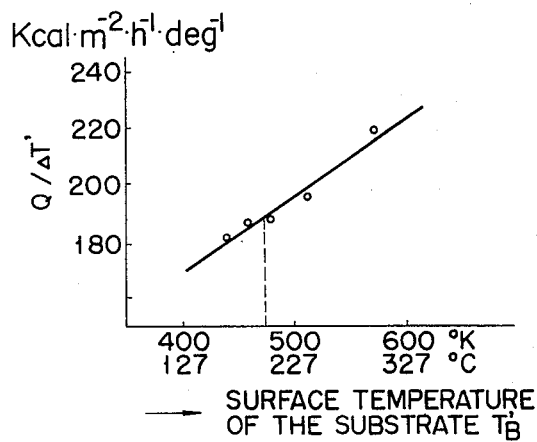
FIG. 5 is a coordinate system showing the relationship of $Q/\Delta T'$ and the temperature $T'_B$ of the substrate of said heat measuring element.

With respect to the relationship of $Q/\Delta T'$ and $T_B'$, there is already obtained the diagram of FIG. 5. When, therefore, $Q/\Delta T'$ (190 Kcal/m²·h·deg.) is measured on the basis of $T_B'=473°K$ and Q on the basis of $\Delta T'=25$ deg., then Q will have a value of 4,750 Kcal/m²·h. This value well agrees within the prescribed tolerance with a value obtained by another heat flow meter bearing a French Pat. No. 7,047,346 (manufactured by Showa Denko K.K. under the trade mark HFM–300) using a slidable ring.

As apparent from the example of measuring an amount of heat (FIG. 4), the infrared radiation thermometer presents as wide a variation as $80 - 40 = 40$ (millivolts) in its output with respect to a temperature difference of 25 deg., permitting application of an ordinary recorder and effecting the measurement of an amount of heat with high precision.

Referring now to the temperature $T_A$ of the surface of the rotary kiln, the ring-shaped copper substrate is tightly fitted to said surface, and the contact heat conductance $\gamma$ is estimated to be more than 1,000 Kcal/m²·h·deg. If $Q=Q'$ in the case of $\gamma=1,000$ Kcal/m²·h·deg. then the difference $(T_A-T_B')$ between the temperature $T_A$ of the surface of the rotary kiln and the temperature $T_B'$ of the surface of the copper substrate 2 will be determined to be about 5 deg. Since, however, Q is actually larger than Q', the temperature difference $(T_A-T_B')$ is smaller than about 5 deg. Namely, the above-mentioned temperature difference $(T_A-T_B')$ is 5 deg. at most. An error of about 5 deg. as against a temperature of 473°K(200°C) does not raise an practical problem. According, it is permissible to take the temperature $T_B'$ of the substrate as the temperature $T_A$ of the rotary kiln.

To effect measurement of temperature with higher precision, it is advisable to determine the temperature $T_A$ of the rotary kiln from the amount of released heat Q by the following equation $$T_A = T_B' + \alpha Q \tag{13}$$

where $\alpha$ is a constant defined by the physical properties of a material constituting the heat measuring element and the condition in which it is fitted to a heat emissive surface.

If, in the embodiment of this invention, the body of the rotary kiln has its outer wall formed of, for example, soft steel of good heat conductivity, it will be unnecessary to use the ring-shaped copper substrate 2. Namely, it is possible to substitute the soft steel outer wall itself for said substrate and fit the thermal resistance plates 3 directly on said outer wall. In this case the relationship of the amount of released heat Q and the temperature difference $\Delta T = T_A - T_C = (1+[K/\gamma])\Delta T$ 09 may be approximately expressed as $$Q = \Delta t \left\{ \frac{1}{\left(\frac{1}{K}+\frac{1}{\gamma}\right)} + 1.25h(T_A - T_0)^{0.25} + 4\epsilon_C \sigma T_A^3 \right\}$$

(14)

As mentioned above, the heat flow meter of this invention enables the temperature of, and the amount of heat given forth from, the heat radiating surface of an object to be measured from a remote place simultaneously and continuously.

What we claim is:

1. A heat flow meter for remote measurement of a heat radiating rotary kiln comprising:
   a band shaped heat conducting substrate wound around and in intimate contact with the surface of the kiln;
   a plurality of thin, thermal resistance plates spaced from each other and mounted on said substrate, each of said plates having its outer surface coated with a specific color to provide approximately the same heat emissivity as that of the heat radiating surface of the kiln; and
   a non contact thermometer so arranged with respect to the kiln to alternately measure the temperatures of said substrate and said plates and wherein the heat conductance of said plates is about 100 to 1,000 KCAL/m²h·deg. at about 350° to 700° K.

* * * * *

UNITED STATES PATENT OFFICE
CERTIFICATE OF CORRECTION

Patent No. 3,821,895          Dated July 2, 1974

Inventor(s) Sadao Sumikama, Yoshiaki Arakawa

It is certified that error appears in the above-identified patent and that said Letters Patent are hereby corrected as shown below:

[75] Inventors: Sadao Sumikama; Yoshiaki Arakawa, both of Yokohama, Japan

Signed and sealed this 29th day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

PATENT NO. : 3,821,895
DATED : July 2, 1974
INVENTOR(S) : SADAO SUMIKAWA and YOSHIAKI ARAKAWA It is certified that error appears in the above-identified patent and that said Letters Patent are hereby corrected as shown below:

Column 3, equation (3)', "$T_A = (K/\gamma)\Delta T - T_B$" should be

---$T_A = (K/\gamma)\Delta T + T_B$---.

Column 3, first line of equation following equation (3)',
"$Q = h([K/\gamma]\Delta T = T_B - T_0)^{1.25} + \epsilon_A \sigma \{(K/\gamma)(\Delta T + T_B)^4 - T_0^4\}$" should be ---$Q = h([K/\gamma]\Delta T + T_B - T_0)^{1.25} + \epsilon_A \sigma \{(K/\gamma)(\Delta T + T_B)^4 - T_0^4\}$---.

Column 3, last line of second equation following equation (3)'
"$+\epsilon_C \sigma (T_B^4 - T_0^4) - 4\epsilon_C **T_B^3 \Delta T + 6\epsilon_C \sigma T_B^2 (\Delta T)^{2-}...$" should be ---$+\epsilon_C \sigma (T_B^4 - T_0^4) - 4\epsilon_C \sigma T_B^3 \Delta T + 6\epsilon_C \sigma T_B^2 (\Delta T)^{2-}...$---.

Page 2

UNITED STATES PATENT OFFICE
CERTIFICATE OF CORRECTION

PATENT NO. : 3,821,895
DATED : July 2, 1974
INVENTOR(S) : SADAO SUMIKAWA and YOSHIAKI ARAKAWA It is certified that error appears in the above-identified patent and that said Letters Patent are hereby corrected as shown below:

Column 4, last line of equation (5)

"$-(\Delta T)^2 [0.156h(T_B-T_O)^{-0.75} + 6\epsilon_c \sigma T_B^2]\{1+ \frac{K}{\gamma}^2\} +$" should be --- $-(\Delta T)^2 [0.156h(T_B-T_O)^{-0.75} + 6\epsilon_c \sigma T_B^2]\{1- \frac{K}{\gamma}^2\} +$ ---.

Column 4, equation (6)

"$Q=\Delta T[K+\{1.25h(T_B-T_O)^{0.25} + 4\epsilon_c \sigma T_B^3\}(1-\frac{K}{\gamma})]$" should be ---$Q=\Delta T[K+\{1.25h(T_B-T_O)^{0.25} + 4\epsilon_c \sigma T_B^3\}(1+\frac{K}{\gamma})]$---.

Column 5, equation (10)

"$\gamma > K > 1.25h(T_B-T_O)^{0.25} + 4\epsilon_c \sigma T_B^3 (1+[K/\gamma])$" should be ---$\gamma > K > \{1.25h(T_B-T_O)^{0.25} + 4\epsilon_c \sigma T_B^3\}(1+[K/\gamma])$---.

UNITED STATES PATENT OFFICE
CERTIFICATE OF CORRECTION

PATENT NO. : 3,821,895
DATED : July 2, 1974
INVENTOR(S) : SADAO SUMIKAWA and YOSHIAKI ARAKAWA It is certified that error appears in the above-identified patent and that said Letters Patent are hereby corrected as shown below:

Column 5, first equation following equation (10)

$$" 1.25h(T_B-T_O)^{0.25}+4\epsilon_c \sigma T_B^3 \; (1+[K/\gamma])" \text{ should be}$$

$$---\{1.25h(T_B-T_O)^{0.25}+4\epsilon_c \sigma T_B^3\}(1+[K/\gamma])---.$$

Column 5, line 58, "termal" should be ---thermal---.

Column 8, line 14, "09" should be omitted.

Signed and sealed this 13th day of May 1975.

(SEAL)
Attest:

RUTH C. MASON
Attesting Officer

C. MARSHALL DANN
Commissioner of Patents
and Trademarks